Oct. 17, 1933.  F. M. FLOYD  1,930,677
MULTIPLE GALVANOMETER
Filed March 16, 1932
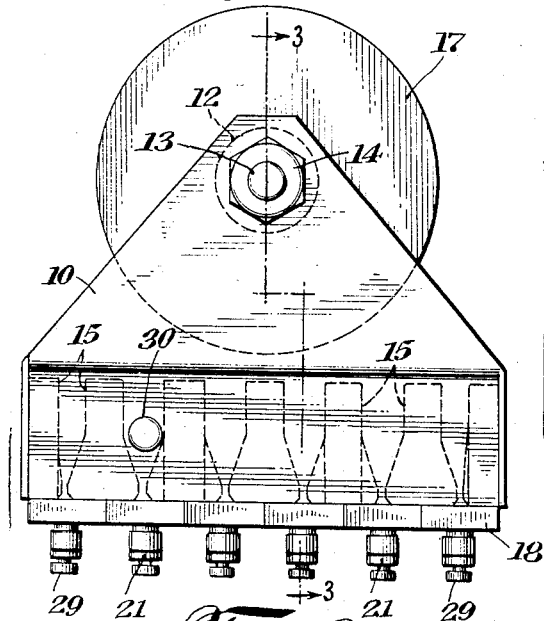
Fig.1.
Fig.2.
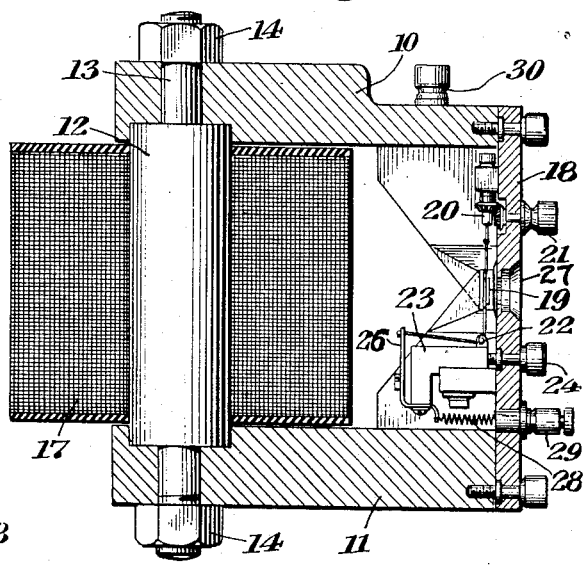
Fig.3.
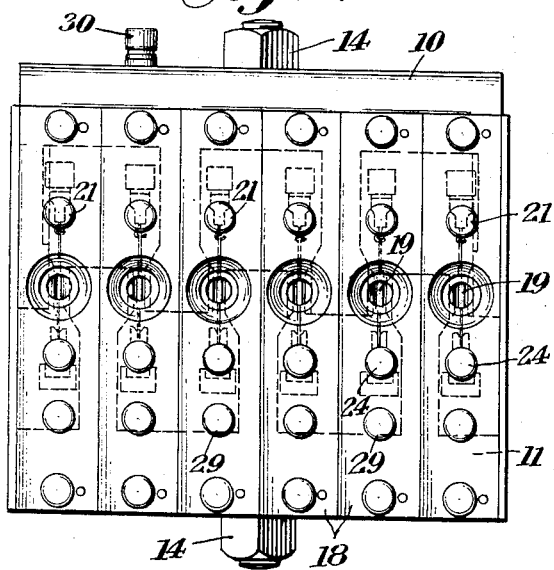
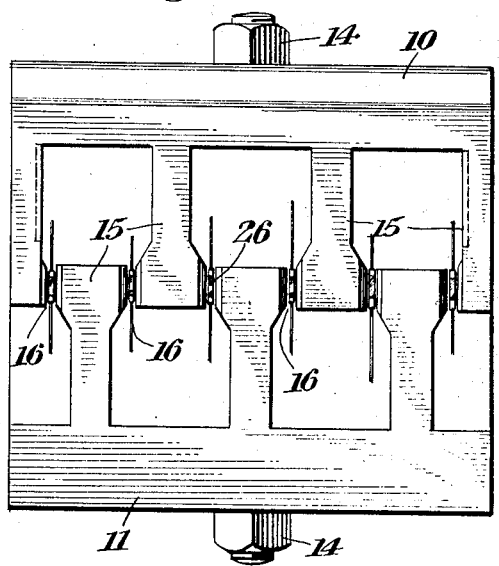
Fig.4.
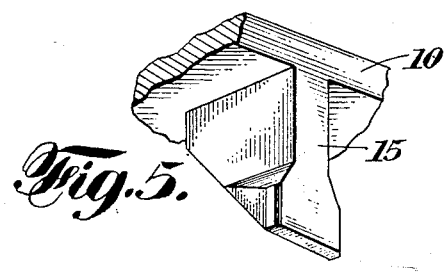
Fig.5.
INVENTOR
Francis M. Floyd
BY
Kenyon & Kenyon
ATTORNEYS Patented Oct. 17, 1933

1,930,677

UNITED STATES PATENT OFFICE 1,930,677

MULTIPLE GALVANOMETER

Francis M. Floyd, Bloomfield, N. J., assignor to Geophysical Research Corporation, New York, N. Y., a corporation of New Jersey Application March 16, 1932. Serial No. 599,088

4 Claims. (Cl. 171—95)

This invention relates to electrical measuring instruments and has for an object a compact, inexpensive efficient and sensitive multiple galvanometer adapted for simultaneously measuring or comparing a plurality of electrical currents.

A galvanometer embodying the invention consists of a plurality of pole pieces supported by opposed plates which are connected by means of a core around which is wound an exciting coil. The pole pieces are arranged to provide a plurality of air gaps which are in parallel relationship to each other and in each of which is mounted a galvanometer element such as a coil or the like. With this parallel relationship of the air gaps, the magneto motive force required to produce the desired magnetic flux density in each of the air gaps is the same as wound be required to produce the same magnetic flux density in a single air gap. As a result, a high flux density may be obtained in each air gap by the use of a small number of ampere turns in the exciting coil, provided of course, that the cross section of the magnetic circuit is everywhere large enough to carry the desired flux without introducing appreciable reluctance into the circuit.

The coil may thus be of relatively small size, thus making the galvanometer compact in structure and also reducing the amount of copper required for the coil, thus reducing the expense while the galvanometer is of high sensitivity due to the high flux density.

Other objects, novel features and advantages of this invention will be apparent from the following specification and accompanying drawing, wherein:

Fig. 1 is a plan view of a galvanometer embodying the invention;

Fig. 2 is a front view;

Fig. 3 is a section on the line 3—3 of Fig. 1;

Fig. 4 is a view similar to Fig. 2 with the supporting plates for the galvanometer elements removed, but with the elements positioned in the gaps, and Fig. 5 is a perspective view of a pole piece.

The top plate 10 and the bottom plate 11 are joined together by a core 12 having its ends seated in recesses in the plates and provided with threaded studs 13 which clamp the plates and core in assembled relation by means of the nuts 14. The plates and core are preferably composed of soft iron. A plurality of pole pieces 15 are supported by each of the plates 10 and 11 in staggered relation to form air gaps 16, these gaps being in parallel relationship with each other. A coil 17 surrounds the core 12 and is provided with suitable terminals (not shown) by means of which exciting current may be supplied thereto. The same magneto motive force is applied to all the air gaps to produce the same magnetic flux density in each gap. Non-magnetic plates 18 are detachably supported by the plates 10 and 11 at their front edges. Each of these plates supports a galvanometer element which may be of any suitable type and in this instance is shown as a coil 19 supported by a uni-filar suspension. The upper end of the uni-filar suspension is supported by a rotatable electrically-conductive member 20 which is carried by the plate 18 and may be turned through the medium of the knob 21. The lower end of the suspension is passed around a pin 22 mounted on a carrier 23 which is movable toward and away from the plate 18 through the medium of the knob 24, the end of the suspension being attached to a spring 26 supported by the carrier 23 and serving to maintain the suspension taut. The coil carries a mirror 25 and the plate is provided with an aperture 27 through which a beam of light may be directed to the mirror. By means of the knobs 21 and 24, the galvanometer elements may be adjusted as the conditions of use may require. The spring 26 is connected through a coil spring 28 with a binding post 29 which is insulatingly supported by the plate 18. A binding post 30 is carried by the top plate 10.

The magneto motive force for producing the magnetic flux in the air gaps is developed by flow of current through the coil 17, this current being suppled from any suitable source. The currents to be measured are passed through the galvanometer elements by way of the binding post 29, coil springs 28, leaf springs 26, the uni-filar suspensions and through the supports 20, plates 18 and binding post 30, which is grounded. The flow of current through the coil 19 causes turning of the coil in the well-known manner under the influence of the magnetic field in the air gap, thereby turning the mirror so that the beam of light reflected therefrom assumes different positions indicating the value of the current flowing through the coil.

The above described apparatus embodies a multiple galvanometer which is compact, inexpensive, efficient and highly sensitive. A relatively small exciting coil may be used due to the parallel arrangement of the air gaps. The desired magnetic flux density in each air gap may be obtained with the same magneto motive force as would be required to produce the same magnetic flux density in a single gap. Therefore, the exciting coil need have only the same number of ampere turns to produce the desired flux density in the various air gaps as would be required for a single air gap, providing the cross-section of iron in the magnetic circuit is sufficient to carry the flux without introducing appreciable reluctance into the circuit. The cost of materials is thus kept low as well as the size of the apparatus being kept small. The above described apparatus makes it possible simultaneously to measure a plurality of electrical currents or to make instantaneous comparison of such currents.

It is of course apparent that various modifications may be made in the structure above described, without in any way departing from the spirit of the invention as defined in the appended claims. In particular, the exciting coil might be omitted and the core replaced by a permanent magnet made of a suitable magnet steel. Another possible modification is the use of a high grade magnet steel for all or part of the magnetic circuit, the whole of which is then magnetized after assembly by any suitable means such as winding a temporary coil about the core and passing a large current through it.

I claim:

1. A multiple galvanometer comprising a pair of iron plates having a plurality of opposed pole pieces forming air gaps in parallel relationship, galvanometer elements suspended in said gaps, an iron core connecting said plates, and an energizing coil surrounding said core.

2. A multiple galvanometer comprising a pair of iron plates having a plurality of opposed offset pole pieces defining air gaps in parallel relationship, non-magnetic members supported by said plates, galvanometer elements suspended by said members in said gaps, an iron core connecting said plates, and an energizing coil surrounding said core.

3. A multiple galvanometer comprising a pair of iron plates having a plurality of opposed offset pole pieces defining air gaps in parallel relationship, non-magnetic members supported by said plates, means for adjustably suspending galvanometer elements from said members in said gaps, an iron core connecting said plates, and an exciting coil surrounding said core.

4. A multiple galvanometer comprising a pair of iron plates having a plurality of opposed offset pole pieces defining air gaps in parallel relationship, non-magnetic members supported by said plates, galvanometer elements suspended by said members in said air gaps, and means for producing magnetic flux flowing through said plates and across said air gaps.

FRANCIS M. FLOYD.